(12) United States Patent
Howes et al.

(10) Patent No.: US 10,378,660 B2
(45) Date of Patent: Aug. 13, 2019

(54) SCREEN VALVE

(71) Applicant: Energy Technologies Institute LLP, Loughborough, Leicestershire (GB)

(72) Inventors: Jonathan Sebastian Howes, Fareham Hampshire (GB); Rowland Geoffrey Hunt, Fareham Hampshire (GB)

(73) Assignee: ENERGY TECHNOLOGIES INSTITUTE LLP, Leicestershire (GB)

( * ) Notice: Subject to any disclaimer, the term of this patent is extended or adjusted under 35 U.S.C. 154(b) by 108 days.

(21) Appl. No.: 15/115,869

(22) PCT Filed: Jan. 30, 2015

(86) PCT No.: PCT/GB2015/050237
§ 371 (c)(1),
(2) Date: Aug. 1, 2016

(87) PCT Pub. No.: WO2015/114362
PCT Pub. Date: Aug. 6, 2015

(65) Prior Publication Data
US 2017/0009893 A1   Jan. 12, 2017

(30) Foreign Application Priority Data

Feb. 3, 2014  (GB) .................................. 1401809.7

(51) Int. Cl.
*F16K 3/02* (2006.01)
*F16K 3/16* (2006.01)
(Continued)

(52) U.S. Cl.
CPC .............. *F16K 3/16* (2013.01); *F16K 3/0209* (2013.01); *F16K 3/18* (2013.01); *F16K 3/316* (2013.01);
(Continued)

(58) Field of Classification Search
CPC ..... F16K 1/24; F16K 3/10; F16K 3/18; F16K 3/0209; F16K 3/0218; F16K 3/316;
(Continued)

(56) References Cited

U.S. PATENT DOCUMENTS 1,758,080 A * 5/1930 Klemm, Jr. .............. F02M 1/00
                                                    137/479
3,393,627 A * 7/1968 Eurich .................... F24F 13/12
                                                    454/324
(Continued)

FOREIGN PATENT DOCUMENTS

GB     2499618 A       8/2013
JP     11-248012 A     9/1999
WO     WO2009074800 A1 6/2009

OTHER PUBLICATIONS

European Search Report for related European Application No. GB1501576.1 dated Feb. 11, 2015.
(Continued)

*Primary Examiner* — Reinaldo Sanchez-Medina
*Assistant Examiner* — Hailey K Do
(74) *Attorney, Agent, or Firm* — Kenealy Vaidya LLP

(57) ABSTRACT

A screen valve (210) to control fluid flow comprising at least one multi-apertured valve plate (220) movable laterally relative to a multi-apertured valve seat (230) between a closed configuration whereby the apertures are not registered to prevent fluid flow, and an open configuration whereby the apertures are registered to permit fluid flow, wherein the valve plate is supported by a multi-apertured carrier plate (240) that moves laterally in synchrony with the valve plate (220) to maintain a predetermined lateral registration between their respective apertures as the valve plate moves between the open and closed configurations, the valve plate being movable relative to the carrier plate so as to be able to lift off and return into contact with the valve
(Continued)

seat. The co-moving carrier plate shields the valve plate so as to minimize pressure locking. Aerodynamic features may be incorporated to urge the valve plate (220) towards or away from the carrier plate (240).

20 Claims, 13 Drawing Sheets

(51) Int. Cl.
*F16K 3/18* (2006.01)
*F16K 15/18* (2006.01)
*F16K 3/316* (2006.01)

(52) U.S. Cl.
CPC .......... *F16K 3/3165* (2013.01); *F16K 15/185* (2013.01); *Y10T 137/784* (2015.04); *Y10T 137/7843* (2015.04); *Y10T 137/7881* (2015.04)

(58) Field of Classification Search
CPC . F16K 7/12; F16K 11/04; F16K 11/06; F16K 11/065; F16K 11/0655; F16K 11/072; F16K 11/074; F16K 11/078; F16K 15/144; F16K 15/147; F16K 15/185; F16K 17/363; F16K 39/04; F16K 39/02; Y10T 137/7839; Y10T 137/784; Y10T 137/7843; Y10T 137/7881; Y10T 137/7895; Y10T 137/865491; Y10T 137/86759; Y10T 137/86879
See application file for complete search history.

(56) References Cited

U.S. PATENT DOCUMENTS

| | | | | |
|---|---|---|---|---|
| 4,440,382 A * | 4/1984 | Pruvot | ...................... | F16K 3/10 |
| | | | | 251/162 |
| 4,624,693 A * | 11/1986 | Marra | ...................... | C03B 37/08 |
| | | | | 137/625.33 |
| 5,218,998 A * | 6/1993 | Bakken | .................. | F24F 13/12 |
| | | | | 137/625.28 |
| 9,476,509 B2 * | 10/2016 | Tuineag | .................. | F16K 3/085 |
| 9,488,281 B2 * | 11/2016 | Howes | .................... | F16K 39/04 |
| 2008/0173836 A1 | 7/2008 | Chern | | |

OTHER PUBLICATIONS

PCT International Search Report and Written Opinion of the International Searching Authority dated May 13, 2015 for corresponding PCT/GB2015/050237.

* cited by examiner

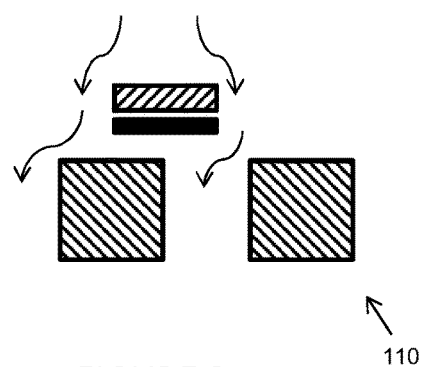
FIGURE 3
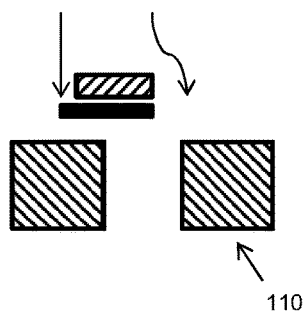 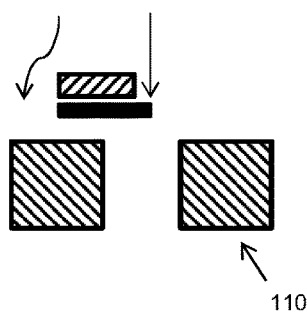 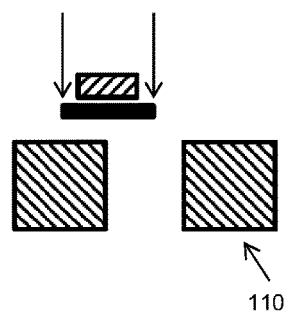
FIGURE 4A  FIGURE 4B  FIGURE 4C

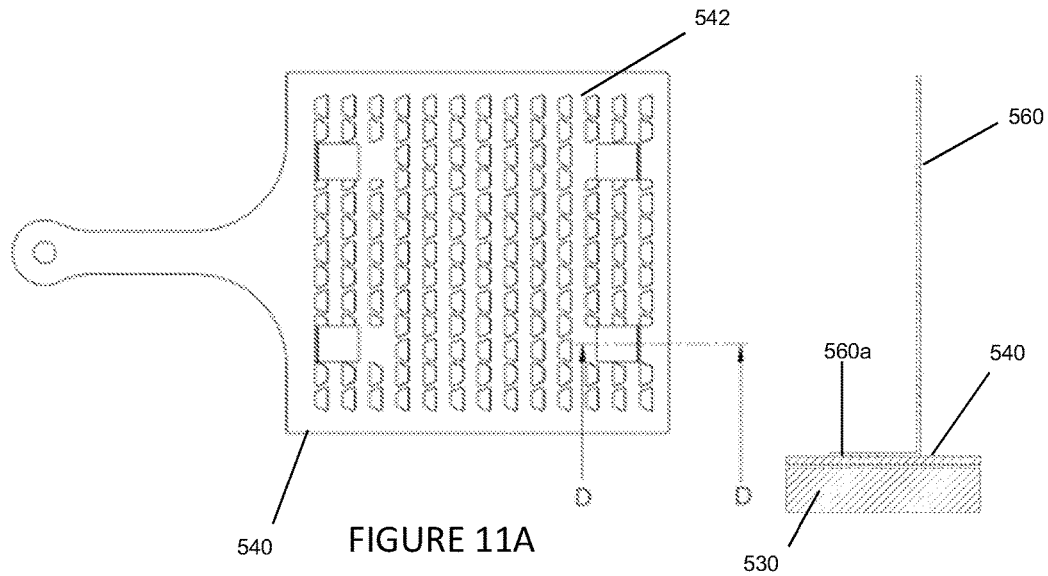
FIGURE 11A
FIGURE 11B
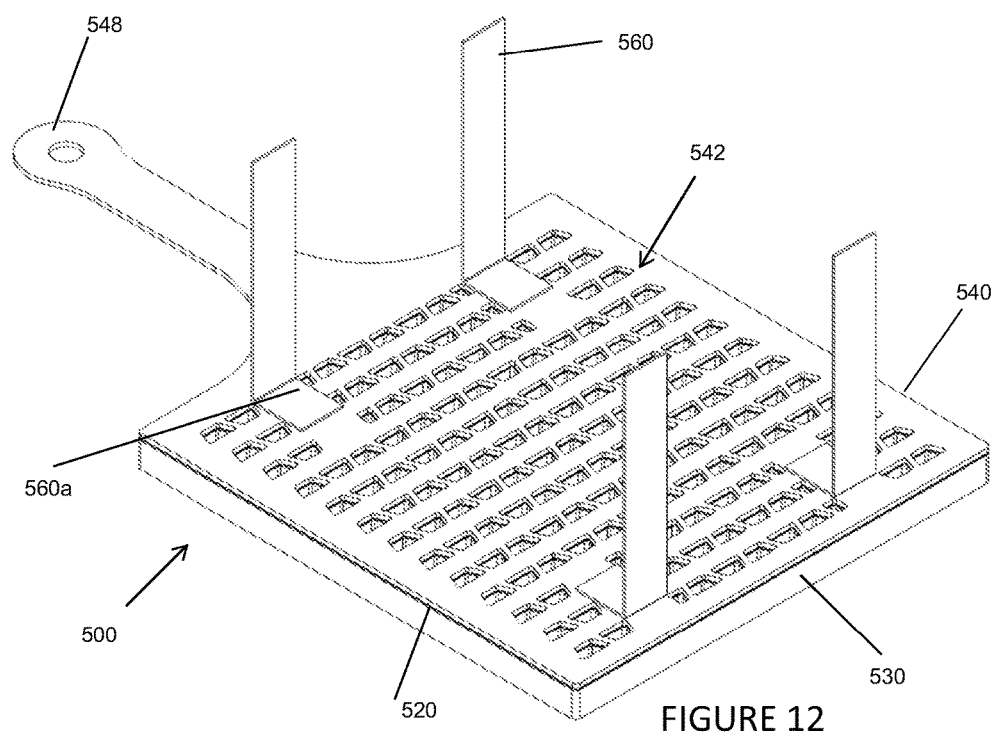
FIGURE 12

SCREEN VALVE

RELATED APPLICATION DATA

This U.S. national phase application is based on international application no. PCT/GB2015/050237, filed on Jan. 30, 2015, which claimed priority to British national patent application no. 1401809.7, filed on Feb. 3, 2014. Priority benefit of the earlier filed application is hereby claimed.

The present invention relates generally to valves for controlling flow of gases and/or liquids between two discrete spaces and, in particular, to a screen valve with a valve plate configured for sliding movement, as well as apparatus incorporating such valves. The invention is particularly concerned with the provision of a sliding screen valve that is able to withstand numerous and/or rapid reciprocating movements over its lifetime.

The term "screen valve" is intended to refer to a valve in which a multi-apertured plate-like valve member moves into and out of register with a multi-apertured valve seat to allow or prevent fluid flow through the multiple apertures or ports. The invention is concerned with sliding screen valves where the plate-like member undergoes a sliding movement relative to the valve seat, i.e. a sideways or lateral movement, as opposed, for example, to a plate valve that lifts perpendicularly on and off the valve seat.

Screen valves may be used in applications such as engines, vacuum pumps, gas compressors, gas expanders, heat engines, heat pumps, other pumps, ducts, pipeflow situations and the like. They may be used in applications in which the pressure in each of the discrete spaces separated by the valve can vary such that at some stage there is no pressure difference between the spaces and at other stages there is a pressure difference.

Applicant's earlier application, WO2009/074800, for example, describes a sliding screen valve comprising a multi-apertured flexible plate-like member configured for lateral reciprocation between an open position and a closed position relative to a static multi-apertured valve seat/retaining plate pairing, which can conform to the face of a multi-apertured valve seat due to its flexibility and hence provide a good quality seal in response to a pressure differential across the valve, and also lock in the closed configuration in response to the pressure differential. It is designed to open automatically upon pressure equalisation. It is important that the time to open and close is kept to a minimum, so it is a benefit if the flexible valve plate can be accelerated and decelerated quickly. However, depending on the pressure loads and speed of operation of the valve, there is a risk during a closing event that the flexible valve plate may be urged by fluid pressure against the static valve seat prematurely before it has reached its fully closed position relative to the valve seat. Similarly, there is a risk during an opening event that the flexible valve plate may be urged by fluid pressure in to contact with the static retaining plate prior to reaching its fully open position.

Accordingly, it would be desirable to improve the reliability of opening and/or closing events and, in particular, to reduce or eliminate the likelihood of pressure locking of the valve plate prior to completion of the opening and/or closing event.

In accordance with the present invention, there is provided a screen valve for controlling fluid flow comprising at least one multi-apertured valve plate movable laterally relative to a multi-apertured valve seat between a closed configuration whereby the apertures are not registered so as to prevent passage of a fluid (e.g. gas), and an open configuration whereby the apertures are registered so as to permit passage of fluid, wherein the at least one valve plate is supported by a multi-apertured carrier plate operative to move laterally in synchrony with the at least one valve plate to maintain a predetermined lateral registration between the apertures of the at least one valve plate and the apertures of the carrier plate as the at least one valve plate moves relative to the valve seat between the open and closed configurations, the at least one valve plate being movable relative to the carrier plate so as to be so as to be able to lift off and return into contact with the valve seat.

Such relative (e.g. a floating) movement of the valve plate (for example, about a rest position) allows the valve plate to lift off and return into contact with the valve seat when in the (lateral) closed configuration (e.g. at one end of its lateral stroke), but not touch it during the lateral movement; this helps reduce wear of the valve plate against the valve seat, particularly for screen valves with rapid reciprocation. However, pressure locking due to the vertical freedom of the valve plate may be problematic. Such a laterally moving (and usually a lightweight, flexible) screen valve may lift off the valve seat during an opening event due to increasing fluid pressure from below the valve seat, or may move down onto the valve seat due to increasing fluid pressure from above the valve seat during a closing event similar to a reed valve action. In the present screen valve, a co-moving carrier plate acts to shield (e.g. wholly or partially) the at least one valve plate from a fluid flow in a valve plate to valve seat direction in order to help reduce the propensity for the at least one valve plate to be forced against the valve seat prematurely before the at least one valve plate has fully reached the lateral closed configuration during a closing event. Equally, during an opening event, the valve plate is no longer at risk of being blown upwardly (by a fluid flow in the valve seat to valve plate direction) to pressure lock against a static surface because the valve plate and carrier plate are co-moving.

The valve plate may move relative to the carrier plate in a generally upward direction away from the valve seat, or, in a direction normal to a plane of the valve seat, to allow the valve plate to lift away from the valve seat.

Usually, the carrier plate will substantially overlie or cover the valve plate and they may have closely matched peripheries. The carrier plate and valve plate will usually each be movable laterally in substantially aligned parallel planes.

In one embodiment, the apertures of the valve plate and carrier plate have a predetermined one to one registration. In one embodiment, pairs of valve plate and carrier plate apertures in one to one registration have substantially identical profiles (e.g. when viewed in a valve plate to valve seat direction). However, the respective apertures of the valve plate and carrier plate may be aligned in other ways that suitably shield without unduly blocking fluid flow. For example, the carrier plate may have individual slots that extend over a number of (e.g. two or three) adjacent aligned apertures of the valve plate.

In one embodiment, the valve plate comprises a first body extending between the apertures of the valve plate and the carrier plate comprises a second body extending between the apertures of the carrier plate, the second body being configured to substantially cover an active region or aperture-containing region (e.g. region exposed to the fluid) of the first body when viewed in a valve plate to valve seat direction. In one embodiment, the second body is configured to substantially fully cover the active region of the first body when viewed in a valve plate to valve seat direction.

In one embodiment, the carrier plate and valve plate have facing inner and outer surfaces at least one of which, conveniently the carrier plate, is provided with protrusions to act as spacers between the two surfaces, so as to preserve a finite gap between them and avoid stiction.

In one embodiment, the carrier plate and valve plate have facing inner and outer surfaces respectively configured to together act as a squeeze film damper. In this way, contact between the carrier plate and valve plate may be prevented during normal operation of the screen valve.

In one embodiment, the screen valve is configured to generate a lifting force acting to lift the at least one valve plate towards the carrier plate (i.e. in a direction away from the valve seat) when a fluid flow passes through the screen valve in a valve plate to valve seat direction, in particular, for at least a part of the lateral stroke where it is approaching the laterally closed position (e.g. after mid-stroke). In this way, the valve plate may be held away from the valve seat for as long as required during a closing event, that is, while the valve plate is still laterally offset from the (laterally) closed configuration but is approaching that lateral position and premature descent is not desired. As the valve plate approaches the valve (laterally) closed configuration, the progressive blockage of the apertures of the valve seat by the valve plate will result in an increase in static pressure upstream of the valve plate relative to the pressure downstream of the valve plate which will overcome the lifting force and urge the valve plate towards the valve seat to seal against the valve seat.

Such a screen valve may be provided with selected aerodynamic features/profiling to interact with the said fluid flow, these being preferably provided around the carrier plate apertures so as to interact with the said fluid flow and generate the lifting force. Such features may additionally be provided around the valve plate apertures or the valve seat apertures, or both. Usually, such features will be provided in a screen valve in which the apertures of the carrier plate and valve plate have a one to one registration, preferably with substantially identical profiles, and ideally, the same correspondence will apply to the valve seat apertures. Such features may be selectively combined to arrive at a screen valve in which the lifting force is reversed (i.e. an opposed force towards the valve seat is generated acting to move the valve plate away from the carrier plate) during a closing event at a selected point along the lateral stroke, usually in the last 25%, or last 15% or 10% of the lateral stroke (where 100% corresponds to the (laterally) closed valve configuration).

In one embodiment, the valve plate is supported by the carrier plate via one or more resilient support elements so configured as to allow limited movement of the valve plate normal to its own plane relative to a relaxed position (e.g. away from or towards the valve seat). In one embodiment, the one or more resilient support elements is configured to constrain the at least one valve plate closely to follow the movements of the carrier plate in the plane of the valve plate, while allowing a floating movement in the direction normal to the plane. In one embodiment, the one or more resilient support elements are configured to generate a bias force that tends to lift the valve plate away from the surface of the valve seat.

In one embodiment the valve plate is separated from the valve seat by a spacing greater than the spacing between the valve plate and the carrier plate. This may be the usual rest position of the valve plate with respect to the carrier plate (e.g. the relaxed position where resilient support elements are supporting the valve plate) and may facilitate the aerodynamic control described above.

In one embodiment, the at least one valve plate is operatively connected to the carrier plate at a plurality of location points along the carrier plate via a plurality of resilient support elements, preferably evenly distributed over the valve plate.

The carrier plate may be supported by any suitable mechanism that allows it to move laterally as required, usually at a fixed spacing above the valve seat. Preferably, the carrier plate is also lightweight but this can make it vulnerable to undesired local deformation or displacement towards or away from its normal spacing from the valve seat due to dynamic pressure loads. Thus, depending on its size and strength, the carrier plate is preferably itself supported uniformly or symmetrically around its periphery, for example, by one or more operative actuator connections alone or in combination with support mechanisms (e.g. on a side opposed to an actuator connection) and/or supported from above and/or below by supports distributed uniformly across its area, in addition to the operative actuator connection.

In one embodiment, the carrier plate is supported by one or more support flexures suspended from a fixed support structure that allow its lateral movement and maintain its spacing above the valve seat. In one embodiment, the one or more support flexures for the carrier plate are connected to the carrier plate at the plurality of location points along the carrier plate, preferably evenly distributed so as to provide uniform support.

In an alternative embodiment, the carrier plate is supported by a roller guide mechanism allowing its lateral movement within a plane a fixed spacing from the plane of the valve seat. The roller guide mechanism may be supported by the valve seat i.e from below the carrier plate, or by a structure above the carrier plate, and is preferably provide around the periphery of the carrier plate.

In one embodiment, the carrier plate is operatively connected to an actuator. It may also be directly supported by an actuator frame.

In one embodiment, the carrier plate is configured for laterally reciprocating movement.

In one embodiment, each aperture of the carrier plate has a section with a cross-sectional area that decreases with increased distance from an outer surface of the carrier plate.

In one embodiment, the section has a tapered (e.g. straight, stepped or curved tapered) profile. In one embodiment, tapered profile extends substantially (e.g. fully) around a periphery of the aperture.

In one embodiment, the section has a stepped tapered profile (e.g. single step profile) to provide a first reduction in cross-sectional area and a straight or curved tapered profile to provide a further reduction in cross-sectional area.

In one embodiment, each aperture of the carrier plate has a further section located between the first-defined section and an inner surface of the carrier plate, the further section having a tapered profile (e.g. curved or straight tapered profile) that increases in cross-sectional area with increased distance from the outer surface of the carrier plate to form a first inwardly protruding peripheral flange defining a first sharp edge (e.g. knife edge). The tapered profile (and the first inwardly protruding peripheral flange) may extend substantially (e.g. fully) around a periphery of the aperture.

In one embodiment, each aperture of the valve plate has a section with a tapered profile (e.g. straight or curved tapered profile) that decreases in cross-sectional area with increased distance from the outer surface of the valve plate to form a second inwardly protruding peripheral flange defining a second sharp edge (e.g. knife edge). The tapered profile (and the second inwardly protruding peripheral flange) may extend substantially (e.g. fully) around a periphery of the aperture.

In this way, a pair of sharp edges may be provided on opposed sides of the gap between the valve plate and carrier plate to form a low pressure hollow operative to increase the region of low pressure between the valve plate and carrier plate and thereby increase tolerance of small geometric errors in the lateral positioning of the valve plate relative to the carrier plate.

In one embodiment, the first and second sharp edges have substantially identical profiles when viewed in a valve plate to valve seat direction.

In one embodiment, each aperture of the valve plate has a further section having a tapered profile (e.g. curved or straight tapered profile) extending between the second inwardly protruding peripheral flange and the inner surface of the valve plate that increases in cross-sectional area with increased distance from the outer surface. In one embodiment, the tapered profile extends substantially (e.g. fully) around a periphery of the aperture.

In one embodiment, the valve seat is provided with upstands so as to reduce the amount of planar surface contact between the valve plate and valve seat in the valve closed configuration.

In one embodiment, the valve seat has an outer surface configured to deflect lateral components of flow to generate a flow with a component in an opposed direction to the valve plate to valve seat direction.

In one embodiment, the outer surface of the valve seat comprises a plurality of deflection profiles each deflection profile associated with a respective aperture of the valve seat.

In one embodiment, each deflection profile comprises a raised lip extending substantially around a periphery of an entrance to its respective aperture.

In one embodiment, the at least one multi-apertured valve plate is a flexible plate-like member.

In one embodiment, the flexible plate-like member is able to conform to the face of the multi-apertured valve seat so as to provide a seal.

There is further provided the use of aerodynamic features in a screen valve as described above selectively to increase the lifting force acting to lift the at least one valve plate towards the carrier plate when a fluid flow is passing through the screen valve in a valve plate to valve seat direction.

In addition, there is provided the use of aerodynamic features in a screen valve as described above selectively to generate a lifting force acting to urge the at least one valve plate towards the carrier plate when a fluid flow is passing through the screen valve in a valve plate to valve seat direction during a closing event after the mid-stroke part of the lateral stroke movement. Preferably, the aerodynamic features are selected such that the lifting force reverses to become a downward force urging the at least one valve plate away from the carrier plate at a selected point during the lateral stroke movement where the valve plate is approaching the fully closed lateral stroke position.

There is further provided a method of operating a screen valve as described above, wherein the screen valve lifts off from the valve seat during opening due to increasing fluid pressure from below the valve seat, and moves down onto the valve seat during closing due to increasing fluid pressure from above the valve seat and aerodynamic features incorporated in at least the carrier plate, and optionally also the valve plate and/or valve seat, selectively increase the lifting force acting to lift the at least one valve plate towards the carrier plate when a fluid flow is passing through the screen valve in a valve plate to valve seat direction, particularly after the mid-stroke lateral position.

There is further provided a screen valve for controlling fluid flow comprising at least one multi-apertured valve plate movable laterally relative to a multi-apertured valve seat between a closed configuration whereby the apertures are not registered so as to prevent passage of a fluid (e.g. gas), and an open configuration whereby the apertures are registered so as to permit passage of fluid, wherein the at least one valve plate is supported by a multi-apertured carrier plate operative to move laterally in synchrony with the at least one valve plate to maintain a predetermined lateral registration between the apertures of the at least one valve plate and the apertures of the carrier plate as the at least one valve plate moves relative to the valve seat between the open and closed configurations, the at least one valve plate being movable relative to the carrier plate in a direction normal to a plane of the valve seat to allow the valve plate to lift away from the valve seat when the valve plate is displaced laterally from the closed configuration.

The present invention will now be described, by way of example only, with reference to the accompanying drawings in which:—

FIGS. 1 to 9 are partial sectional views illustrating the registration/geometry of only a few apertures/lands within a screen valve, while FIGS. 11 to 16 depict entire screen valves i.e. the carrier plate/valve plate/valve seat in full.

FIG. 3 is a schematic view illustrating fluid flow around the carrier plate/valve plate of the screen valve of FIG. 2A;

FIGS. 4A to 4C are schematic views of alternative configurations of registration between the carrier plate and valve plate of the screen valve of FIG. 2A;

FIG. 5 shows schematic views of a resilient support element used in the screen valve of FIG. 2A in a sealed and unsealed configuration;

FIG. 6 shows schematic side views of a screen valve in accordance with a second embodiment of the present invention in open, mid-stroke and closed configurations;

FIG. 7 is a schematic side view of a screen valve in accordance with a third embodiment of the present invention in a mid-stroke configuration;

FIG. 8 is a schematic side view of a screen valve in accordance with a fourth embodiment of the present invention in a mid-stroke configuration;

FIG. 9 is a schematic side view of a screen valve in accordance with a fifth embodiment of the present invention in the open configuration, including an enlarged partial view of the geometric profile of the valve;

FIGS. 11A and 11B are schematic plan and sectional views of a screen valve in accordance with a sixth embodiment of the present invention;

FIG. 12 is a schematic perspective view of the screen valve of FIGS. 11A and 11B;

FIG. 13 is a schematic exploded view of the screen valve of FIGS. 11A and 11B;

FIG. 14 is a schematic perspective view of a screen valve in accordance with a seventh embodiment of the present invention;

FIG. 15 is a schematic exploded view of the screen valve of FIG. 14; and,

FIGS. 1A-1D

Figure 1A:
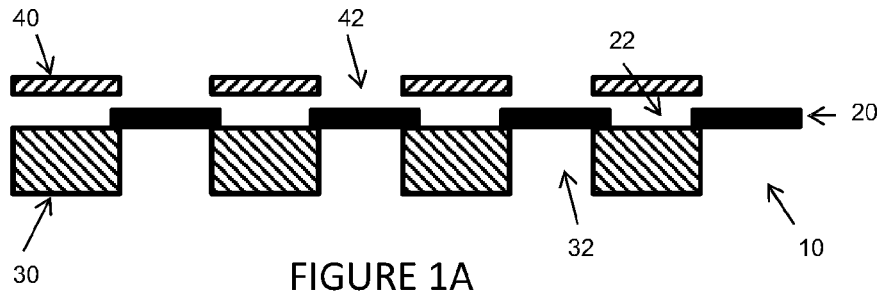
FIG. 1A is a schematic side view of a PRIOR ART screen valve in a closed configuration.

FIGS. 1A-D show a screen valve 10 based on a design of prior art valve disclosed in WO2009/074800, screen valve 10 comprising a thin flexible valve plate 20 provided between a static valve seat 30 and a static retaining plate 40. Valve plate 20 is movable laterally relative to valve seat 30 and retaining plate 40 and defines a first array of apertures 22 registrable in an open configuration with second and third arrays of apertures 32, 42 defined by valve seat 30 and retaining plate 40 respectively.

FIG. 1A shows screen valve 10 in a closed configuration with valve plate 20 overlying valve seat 30 wherein the first aperture array 22 is not registered with the second and third apertures arrays 32, 42 to prevent passage of a fluid through the valve.

Figure 1B:
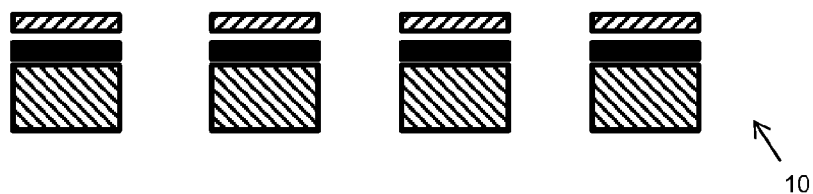
FIG. 1B is a schematic side view of the screen valve of FIG. 1A in an open configuration.

FIG. 1B shows screen valve 10 in an open configuration with first aperture array 22 registered with second and third aperture arrays 32, 42 to allow passage of fluid through the valve.

Figure 1C:
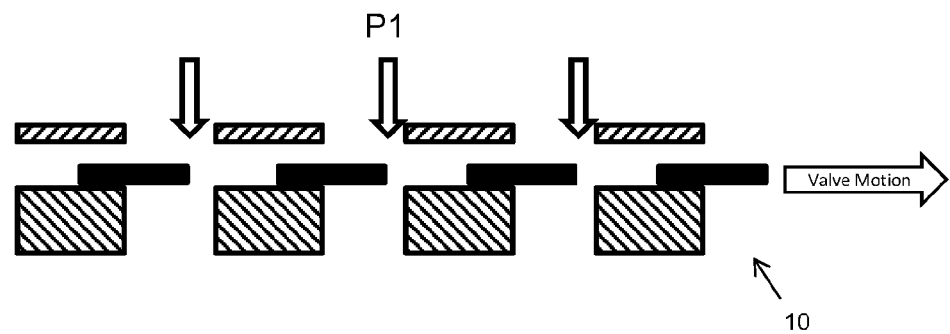
FIG. 1C is a schematic side view of the screen valve of FIG. 1A in a mid-stroke configuration during closing.

FIG. 1C shows valve plate 20 in a mid-stroke configuration during closing of the valve plate. If a fluid flow is passing through screen valve 10 in a valve plate to valve seat direction a fluid dynamic pressure loading "P1" is developed on valve plate 20 in the valve plate to valve seat direction. If valve plate 20 contacts valve seat 30 prior to completion of its lateral closing motion, pressure loads on valve plate 20 may friction lock valve plate 20 against valve seat 30 in a non-fully closed position thereby preventing correct operation of the valve. This may result in an engine malfunction or degradation in its performance.

Figure 1D:
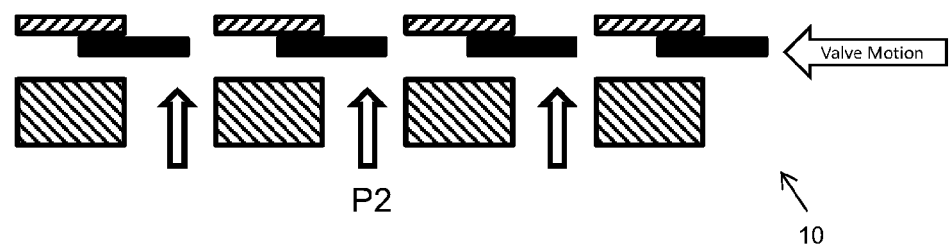
FIG. 1D is a schematic side view of the screen valve of FIG. 1A in a mid-stroke configuration during opening.

FIG. 1D shows valve plate 20 in a mid-stroke configuration during opening of the valve plate. As illustrated, on opening valve plate 20 acts as a reed valve and is lifted off valve seat 30 by increasing pressure "P2" on the seat side of the screen valve 10. As valve plate 20 is thin and therefore of low mass per unit area, it may move extremely rapidly and may contact static retaining plate 40 before valve plate 20 has reached the open configuration thereby potentially reducing operation efficiency of the valve.

FIGS. 2A-2D

FIGS. 2A-D show a screen valve 110 in accordance with a first embodiment of the present invention comprising a thin flexible valve plate 120 movable laterally relative to a valve seat 130. Valve plate 120 and valve seat 130 define first and second arrays of registrable apertures 122, 132 respectively. Valve plate 120 is supported by a movable carrier plate 140 defining a third array of apertures 142 and operative to move laterally in synchrony with valve plate 120, overlying the same to maintain a predetermined one to one lateral registration between the first and third arrays of apertures 122, 142 as valve plate 120 moves relative to valve seat 130 between open and closed configurations. Carrier plate 140 is configured to restrict movement of valve plate in a direction normal to a plane of the valve seat whilst allowing some limited degree of movement to enable valve plate 120 to move towards or lift away from valve seat 130 (e.g. lifting as or just before the valve plate 120 is displaced laterally from the closed configuration).

Figure 2A:
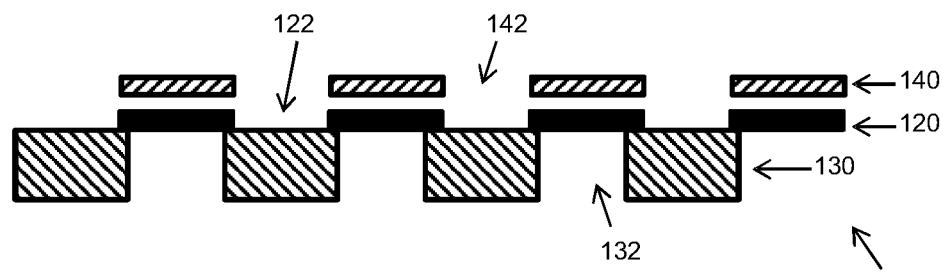
FIG. 2A is a schematic side view of a screen valve according to a first embodiment of the present invention in a closed configuration.

FIG. 2A shows screen valve 110 in a closed configuration with valve plate 120 overlying valve seat 130 wherein the first and third aperture arrays 122, 142 are not registered with the second aperture arrays 132 to prevent passage of a fluid through the valve.

Figure 2B:
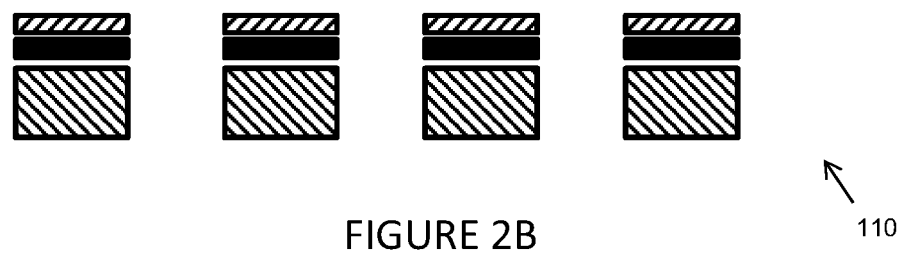
FIG. 2B is a schematic side view of the screen valve of FIG. 2A in an open configuration.

FIG. 2B shows screen valve 110 in an open configuration with first and third aperture arrays 122, 142 registered with second aperture array 132 to allow passage of fluid through the valve.

Figure 2C:
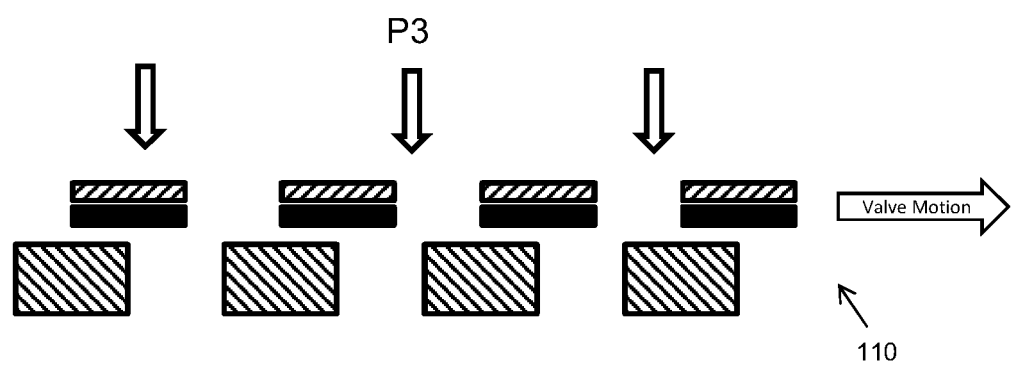
FIG. 2C is a schematic side view of the screen valve of FIG. 2A in a mid-stroke configuration during closing.

FIG. 2C shows valve plate 120 in a mid-stroke configuration during closing of the valve plate. If a fluid flow is passing through screen valve 110 in a valve plate to valve seat direction (this being the more problematic flow direction), as the valve starts to approach the closed (lateral) position, a fluid dynamic pressure loading "P3" is developed in the valve plate to valve seat direction urging the valve plate towards the valve seat but, by virtue of the registration of overlying carrier plate 140 with valve plate 120, carrier plate 140 acts to shield (the solid areas of) valve plate 120 from the full pressure loading thereby reducing the speed at which valve plate 120 is urged towards valve seat 130 during a closing event.

Figure 2D:
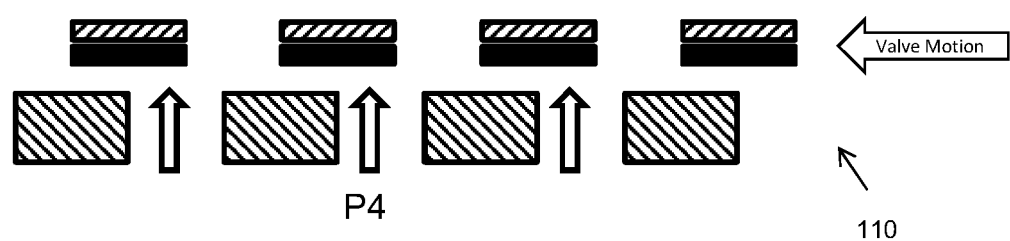
FIG. 2D is a schematic side view of the screen valve of FIG. 2A in a mid-stroke configuration during opening.

FIG. 2D shows valve plate 120 in a mid-stroke configuration during opening of the valve plate. As illustrated, valve plate 120 is lifted off valve seat 130 by increasing pressure "P4" from the seat side of the screen valve 110, but, due to the co-moving carrier plate 140, the valve plate is not at risk of contacting a static surface that it could lock against by friction locking under the pressure loads. Also, fluid located between valve plate 120 and carrier plate 140 may act as a squeeze film damper which acts to slow progress of valve plate 120 towards carrier plate 140 and help prevent contact between these parts during normal operation of the screen valve.

As illustrated in FIG. 3, first and third aperture arrays 122, 142 may be configured such that carrier plate 140 fully covers the solid body of valve plate 120 when viewed in the valve plate to valve seat direction to provide full shielding of valve plate 120 (i.e. with each aperture pair in one to one registration having substantially identical profiles when viewed in the valve plate to valve seat direction so that the respective lands (solid areas) are co-extensive). However, as illustrated in FIGS. 4A to 4C, first and third aperture arrays 122, 142 may also be configured to only substantially cover the solid body of valve plate 120 when viewed in the valve plate to valve seat direction (i.e. the lands of the carrier plate are smaller) to provide only partial shielding of valve plate 120.

Figure 5:
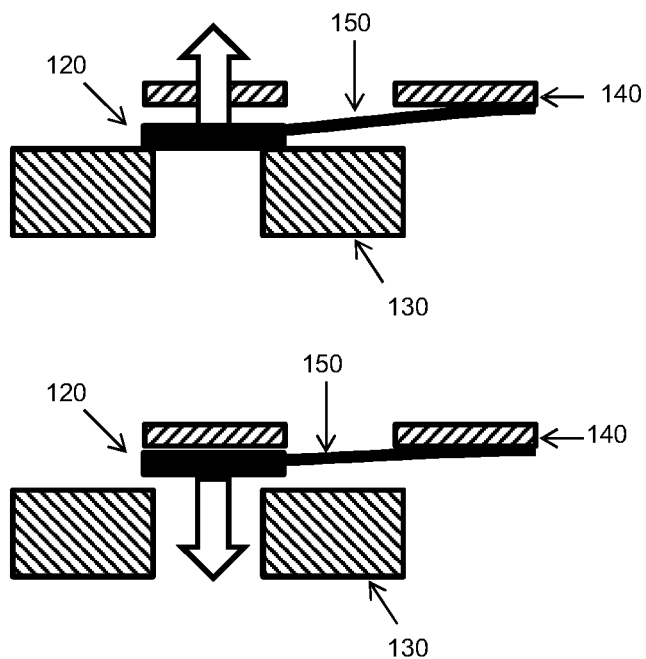

As shown in FIG. 5, valve plate 120 will typically be supported by carrier plate 140 via one or more resilient support element(s) 150 configured to allow limited movement of the valve plate 120 away from or towards valve seat 130 relative to a relaxed position between valve seat 130 and carrier plate 140. In this way, a "floating" valve plate is provided that is mechanically biased to maintain orientation in the relaxed position, with resilient support element 150 providing a biasing force that assists in lifting valve plate 120 away from valve seat 130 when the valve is not required to seal against valve seat 130. The resilient support element 150 may comprise a flat spring element.

FIGS. 6 to 9

Figure 6:
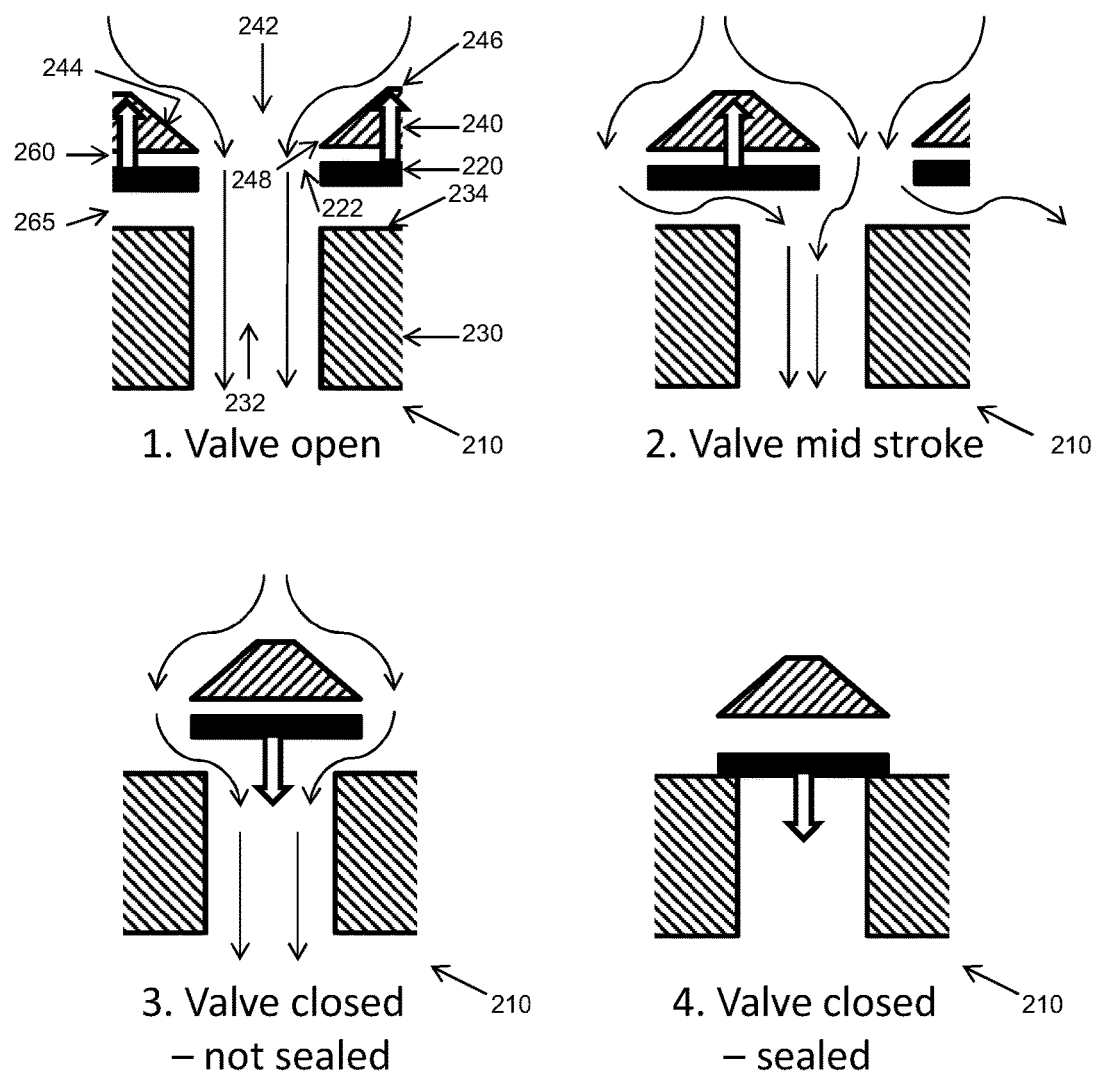

FIG. 6 shows a screen valve 210 in accordance with a second embodiment of the present invention comprising a thin flexible valve plate 220 movable laterally relative to a valve seat 230. In common with screen valve 110, valve plate 220 and valve seat 230 define first and second arrays of registrable apertures 222, 232 respectively and valve plate 220 is supported via resilient support elements (not shown) by a movable carrier plate 240 defining a third array of apertures 242 that is operative to move laterally in synchrony with valve plate 220 to maintain a predetermined one to one lateral registration between the first and third arrays of apertures 222, 242 as valve plate 220 moves relative to valve seat 230 between open and closed configurations.

The first embodiment screen valve 110 of FIGS. 2 to 5 with co-moving, registered carrier plate has plain apertures (e.g. straight sides). It facilitates valve opening and provides some shielding for valve closing. However, the screen valve embodiments of FIGS. 6 to 9 additionally incorporate selected aerodynamic features that actively control the valve plate descent onto the valve seat relative to the extent of the lateral stroke movement so as to improve the reliability of closing events. As will be described below, such aerodynamic features can generate an upward lifting force on the valve plate urging the valve plate and carrier plate together so as to prevent the valve plate dropping onto the valve seat prematurely during the lateral stroke, followed by a force reversal later in the stroke encouraging the valve plate then to drop onto the valve seat; the point at which the force reversal occurs may be selectively tuned to suit the particular screen valve and operating conditions.

Screen valve 210 thus differs from screen valve 110 in that screen valve 210 is configured by use of aerodynamic features to generate a lifting force acting to lift valve plate 220 away from valve seat 230 (upward double arrow) when a fluid flow passes through the screen valve in the valve plate to valve seat direction and to generate a force in the reverse direction (downward double arrow) when valve plate 220 is positioned laterally so it is close to or in the (laterally) closed configuration, and descent of the valve plate is desired.

Aerodynamic valve plate control is achieved in this embodiment by providing each aperture of the third array of apertures 242 with an inner surface 244 defining a tapered cross-sectional profile having a cross-sectional area that decreases linearly with increased distance from an outer surface 246 of carrier plate 240 to create a sharp edge (e.g. knife edge) 248 around which the flow will turn on exiting each aperture of the carrier plate.

FIG. 6 illustrates a closing event of the screen valve for a few representative apertures of the respective plates, where the fluid flow is passing from the valve plate to valve seat direction and there is a possible risk of premature pressure locking against the valve seat. Thus, position 1 (0% of lateral stroke) illustrates the closing event commencing with the valve plate about to move laterally off from the (laterally) open configuration, to position 2 where the valve plate is at about mid-stroke, to position 3 where the valve plate has reached the (laterally) closed configuration (100% lateral stroke), and finally, to position 4 (100% lateral stroke), where the valve has descended to seal against the valve seat.

As illustrated, in the valve open position (position 1) fluid is deflected as it passes through carrier plate apertures 242. As fluid subsequently passes through valve plate and valve seat apertures 222, 232, the fluid passes a first gap 260 between valve plate 220 and carrier plate 240 and a second gap 265 between valve plate 220 and valve seat 230. If second gap 265 is wider than first gap 260, a greater quantity of flow will impinge on edges of valve seat 230 than on edges of valve plate 220, thereby resulting in a small pressure rise in second gap 265 relative to first gap 260 which is approximately at the static pressure of the flow above carrier plate 240. A small lifting force is consequently generated to encourage valve plate 220 to move towards carrier plate 240. This force continues to be generated as valve plate moves laterally between the open configuration and the closed configuration so long as second gap 265 is wider than first gap 260.

In the mid-stroke valve position 2, a further aerodynamic mechanism assists lifting of valve plate 220 away from valve seat 230 as lateral components of the flow deflected by carrier plate 240 are subject to a sharp change in direction of flow around each sharp edge 248 of the tapered carrier plate apertures 242. This sharp change of direction results in generation of a lower pressure on the inside of the curved flow than the outside and thereby reducing pressure in first gap 260 relative to second gap 265. The more sharp this change in flow direction becomes and the closer in proximity to the ends of first gap 260 the more effective it is in reducing pressure in first gap 260. If the bevel angle of inner surface 244 is laterally shallow this results in a more aggressive flow direction change around the edge of carrier plate 240 in direct proximity to the upper edges of valve plate 220. As the reduced pressure on the side of a curved flow reduces approximately in inverse proportion to the radius of curvature of the flow for a given flow velocity, this results in an enhanced pressure drop at this localised point. Since first gap 260 is only in fluid communication with this region of the flow, pressure in first gap 260 is also reduced.

Furthermore, flow impinging on an upper surface 234 of valve seat 230 as it is exposed by lateral movement of valve plate 220/carrier plate 240 results in a raised pressure on the exposed upper surface 234. As the pressure within valve seat apertures 232 is now lower than pressure above valve plate 220, this results in a lateral pressure differential that generates a sideways fluid flow through second gap 265. This sideways flow must turn to pass through valve seat apertures 232 and this acceleration in a vertical direction results in an increased pressure on the lower surface of valve plate 220.

As valve plate 220/carrier plate 240 moves laterally towards closure (see position 3), the pressure drop across screen valve 210 increases progressively due to the flow blockage caused by the movement out of registration of first and third aperture arrays 222, 242 relative to second aperture array 232. This results in static pressure above valve plate 220 (i.e. on the carrier side of valve plate 220) increasing relative to the static pressure below valve plate 220. As this relative change in static pressure increases it also results in pressure in first gap 260 increasing relative to the pressure below valve plate 220 and consequentially the net pressure force on valve plate 220 will reverse in direction and valve plate 220 will be forced towards valve seat 230 as illustrated in position 4.

In this way, a screen valve is provided in which valve plate 220 is held away from valve seat 230 when valve plate 220 is displaced from the closed configuration and is urged against valve seat 230 only when valve plate 220 is close to or fully in the closed position.

Figure 7:
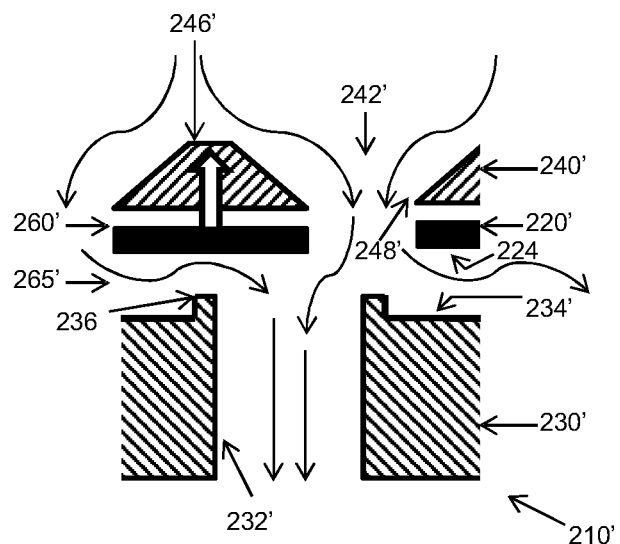

FIG. 7 shows an alternative screen valve arrangement 210' based on screen valve arrangement 210 (corresponding features are labeled accordingly) where the valve plate and valve seat incorporate aerodynamic features. The enhanced valve seat 230' has an entrance to each aperture of the second aperture array 232' of valve seat 230' formed by a raised peripheral lip 236 projecting from a flat region of upper surface 234' extending between adjacent apertures. The provision of raised peripheral lip 236 causes lateral components of flow along second gap 265' to move more slowly (and hence at higher pressure) over valve seat 230' and generates an upward component of flow. This results in a more aggressive change in direction to turn the flow through apertures 232'. As the pressure on the outside of this curved flow is increased relative to that on the inside, and this flow impinges directly upwardly onto a lower surface 224 of valve plate 220', raised peripheral lip 236 acts to create an increased pressure load in the valve seat to carrier plate direction to enhance the aerodynamic lifting action when the valve plate is displaced from the closed configuration. A further advantage of the raised peripheral lip 236 is that the area of contact between valve plate 220' and valve seat 230' is reduced when valve plate 220' is in the closed configuration such that suction loads resisting the lifting of the valve on opening are reduced.

The raised peripheral lip 236 may have straight outer wall profile as shown or alternatively a curved outer wall (e.g. formed by a valve seat with concave upper surfaces between adjacent apertures).

Figure 8:
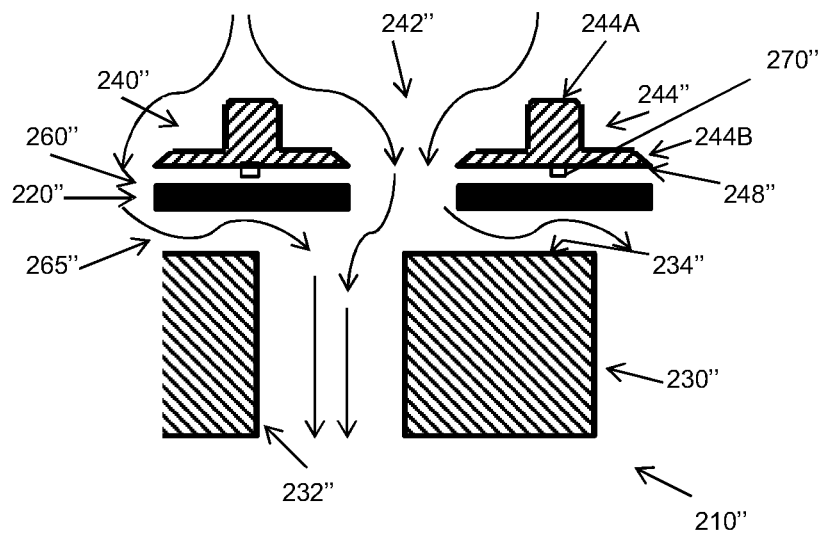

FIG. 8 shows a further alternative screen valve arrangement 210" based on screen valve arrangement 210 (corresponding features are labeled according) with an enhanced carrier plate 240" wherein each aperture of the third array of apertures 242" defines an inner surface 244" having a first tapered cross-sectional profile 244A with a single-step profile to provide a first reduction in cross-sectional area and a second tapered cross-sectional profile 244B having a cross-sectional area that decreases linearly with increased distance from an outer surface 246" of carrier plate 240". In this way, the effective bevel angle of the aperture profile is reduced. In turn, this further reduces the flow direction change radius and further reduces the pressure at sharp edge 248" of carrier plate 240". A small protruding element/spacer 270" may be provided on the underside of the carrier plate 240", if required, to ensure that there is always a finite gap between the carrier plate 240" and valve plate 220", hence facilitating the valve plate moving away from the carrier plate (e.g. on closing). However, squeeze film effects or the configuration of supporting elements provided to support the valve plate from the carrier plate may also achieve this.

Figure 9:
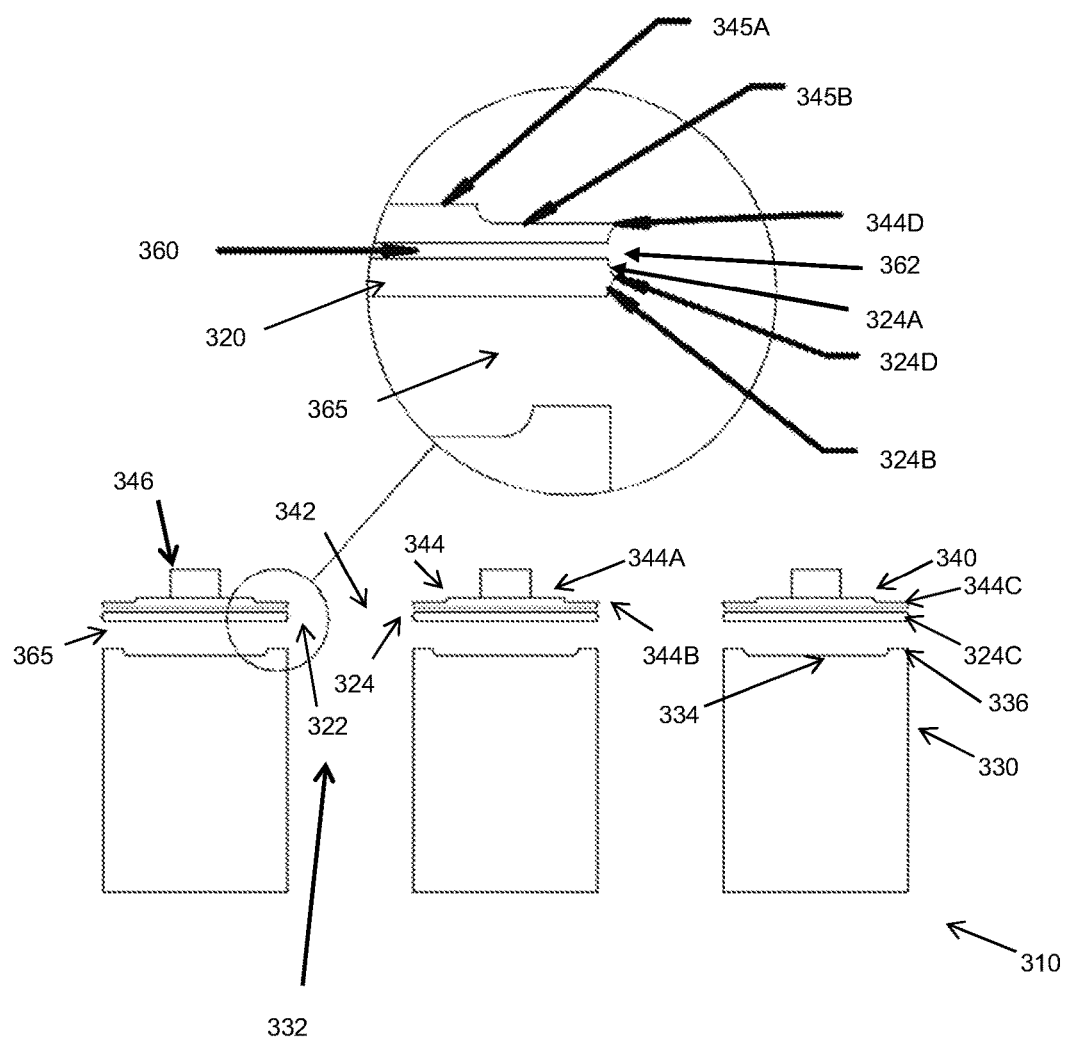

FIG. 9 shows an example of a screen valve 310 in accordance with a fifth embodiment of the present invention based on an error tolerant design for incorporating the aerodynamic features discussed in the previous screen valve designs.

Screen valve 310 comprises a thin flexible valve plate 320 defining a first array of apertures 322 and is movable laterally relative to a valve seat 330 defining a second array of apertures 332 registrable with the first array of apertures 322 (the second array of apertures 332 each having an entrance formed by a raised peripheral lip 336 projecting from a flat region of an upper surface 334 of valve seat 330 extending between adjacent apertures). Valve plate 320 is supported by a movable carrier plate 340 defining a third array of apertures 342 fixed laterally relative to valve plate 320 via a plurality of resilient support elements (not shown) which connect to carrier plate 340 at a plurality of connection locations to allow limited movement of valve plate 320 away from and towards valve seat 330 relative to a relaxed position (thereby varying the width of a first gap 360 between valve plate 320 and carrier plate 340 and a second gap 365 between valve plate 320 and valve seat 340) whilst maintaining a predetermined one to one registration between the first and third arrays of apertures 322, 342.

As shown in FIG. 9, each aperture of the third array of apertures 342 defines an inner surface 344 having a first tapered cross-sectional profile 344A with a stepped profile comprising first and second steps 345A, 345B to provide a reduction in cross-sectional area with increased distance from an outer surface 346 of carrier plate 340 and a subsequent curved tapered cross-sectional profile 344B having a cross-sectional area that increases with increased distance from an outer surface 346 of carrier plate 340 to form a first inwardly protruding peripheral flange 344C forming a first knife edge 344D.

Each aperture of the first array of apertures 322 defines an inner surface 324 having a first curved tapered cross-sectional profile 324A having a cross-sectional area that decreases with increased distance from an outer surface 326 of valve plate 320 and a subsequent second curved tapered cross-sectional profile 324B having a cross-sectional area that increases with increased distance from outer surface 326 of valve plate 320 to form a second inwardly protruding peripheral flange 324C forming a second knife edge 324D having a profile substantially identical to the first knife edge 344D of first inwardly protruding peripheral flange 344C. Together first and second knife edges 324D, 344D define opposed ends of a curved hollow 362 located at the entrance to first gap 360.

First tapered profile 344A results in a lateral fluid flow encountering knife edge 344D and turning to pass through valve seat aperture 332, or into second gap 365, resulting in the flow in hollow 362 being at a reduced pressure with respect to the static pressure above carrier plate 340. This fluid region is in communication with first gap 360 which is also exposed to this reduced pressure. Advantageously, hollow 362 acts to enlarge the size of the low pressure zone between valve plate 320 and carrier plate 340 and makes the assembly much less sensitive to small geometric variations from the ideal geometry, such as small geometric errors in the positioning of the valve plate edge with respect to the carrier plate. This in turn allows fine tuning of the geometry to control the closing point for a particular embodiment.

Peripheral lip 336, first and second tapered profiles 324A, 324B, second step 345B, and tapered profile 344B may be formed by any suitable method known in the art, depending in particular on the size (e.g. thickness), materials, and treatments and/or coatings applied to the respective carrier plate, valve plate and valve seat components.

FIG. 10

Figure 10:
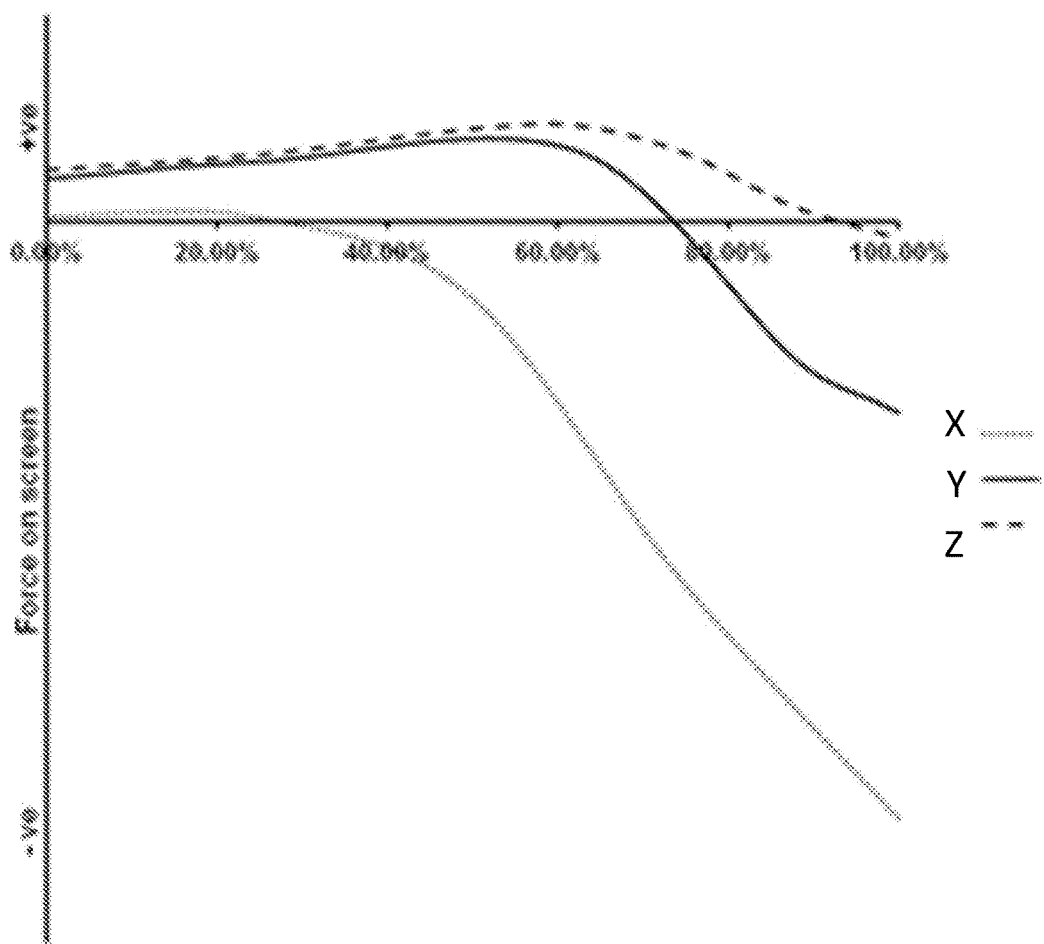
FIG. 10 is a graph comparing calculated uplift performance for the screen valve profiles illustrated in FIG. 2A, FIG. 7 and FIG. 9.

Referring to FIG. 10, this is a graph showing the localised dynamic force acting on the valve plate against lateral position between the open and closed configurations (with 0% representing the fully open configuration and 100% representing the fully closed configuration) calculated for the geometries of various screen valves, to illustrate the expected closing position for a predetermined flow condition. The forces acting on screen valve 110 is shown as dotted line X, while lines Y and Z relate to later described screen valve 210' (FIG. 7) and screen valve 310 (FIG. 11).

It may be seen that plain screen valve 110 (line X) hardly experiences an upward lift force on its valve plate, but rather for most of the stroke is only subject to a downward force. This may be suitable for valves operating in environments with slow fluid flow for example. The screen valves of FIGS. 7 (line Y) and 11 (line Z) show an upward lift force for more than 75% of the stroke; in valves in more demanding environments this may provide good resistance to accidental pressure locking against the valve seat before the fully closed stroke position has been reached. The FIG. 7 valve plate shows a sharper and earlier force reversal and will therefore drop onto the valve seat harder and earlier than that of FIG. 11. However, the latter valve has the advantage that its profiling is more tolerant of geometric errors so that the force reversal point can be finely adjusted to suit the valve operation.

FIGS. 11-13

Figure 13:
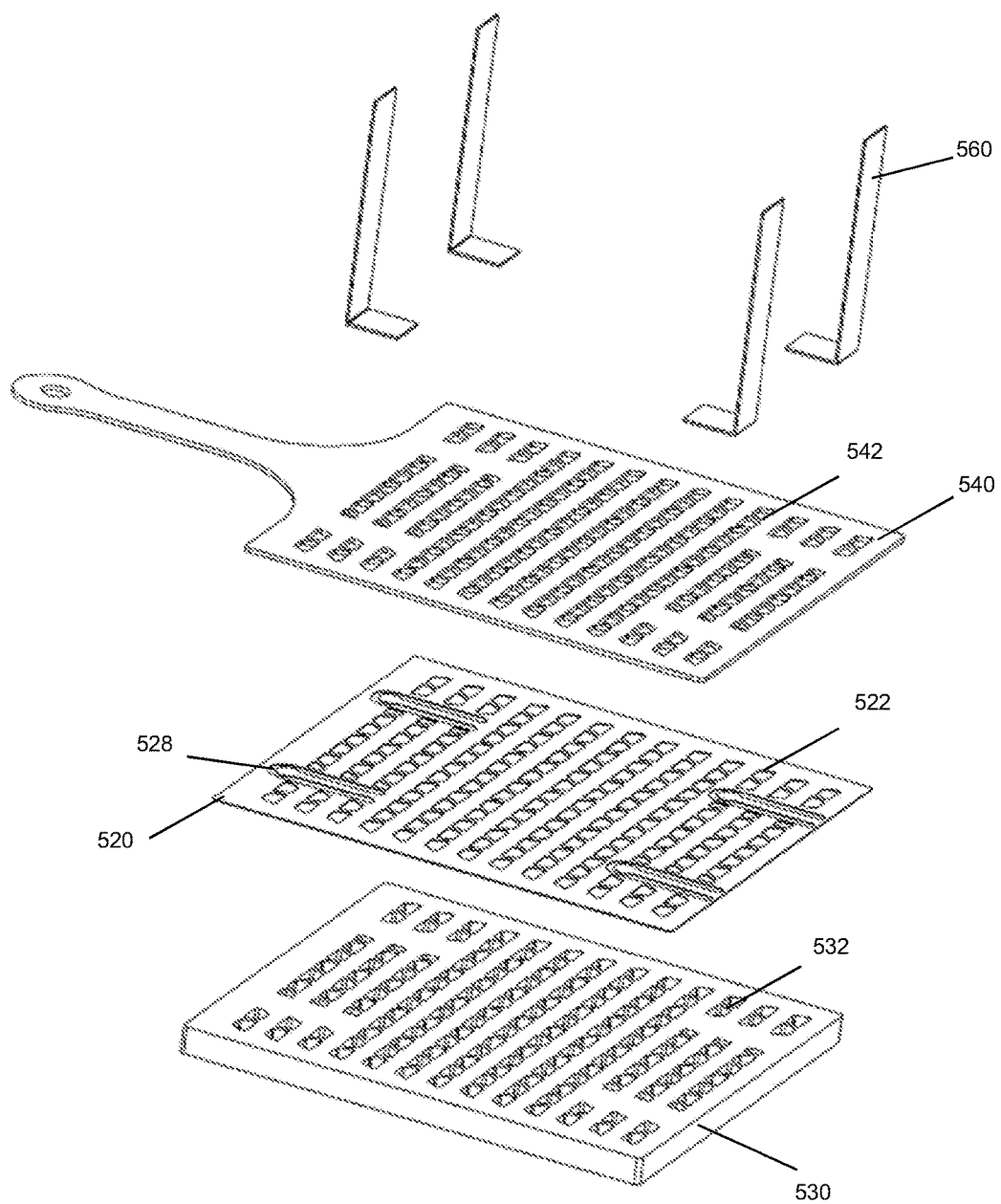
Figure 14:
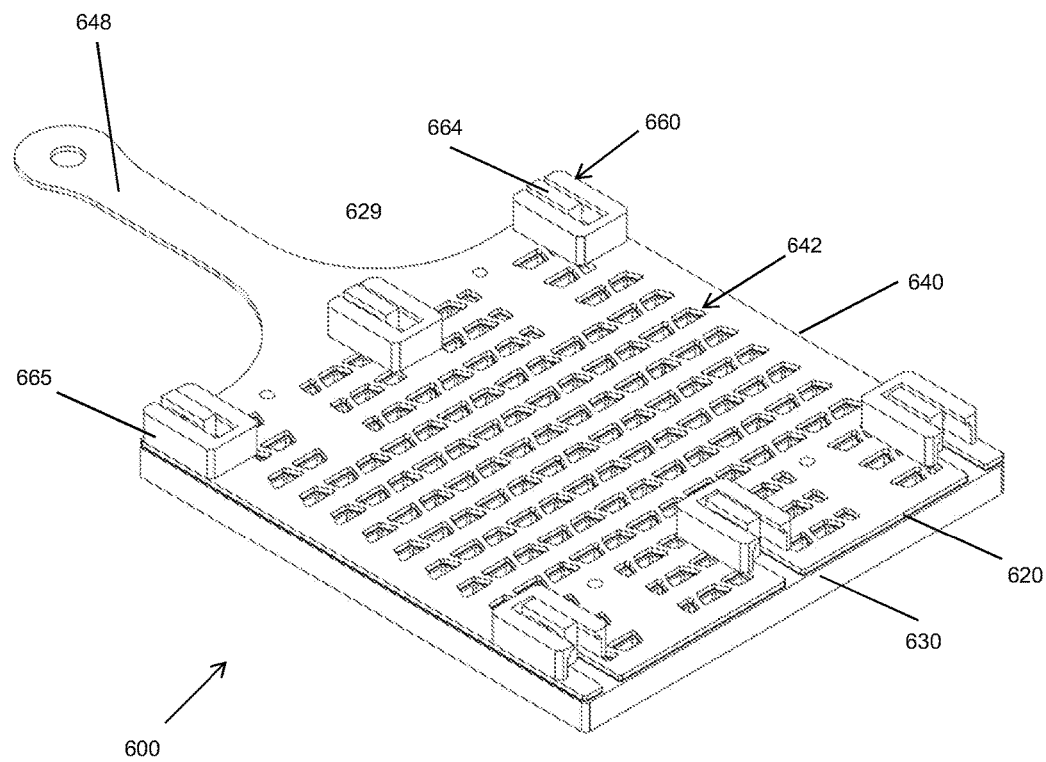
Figure 15:
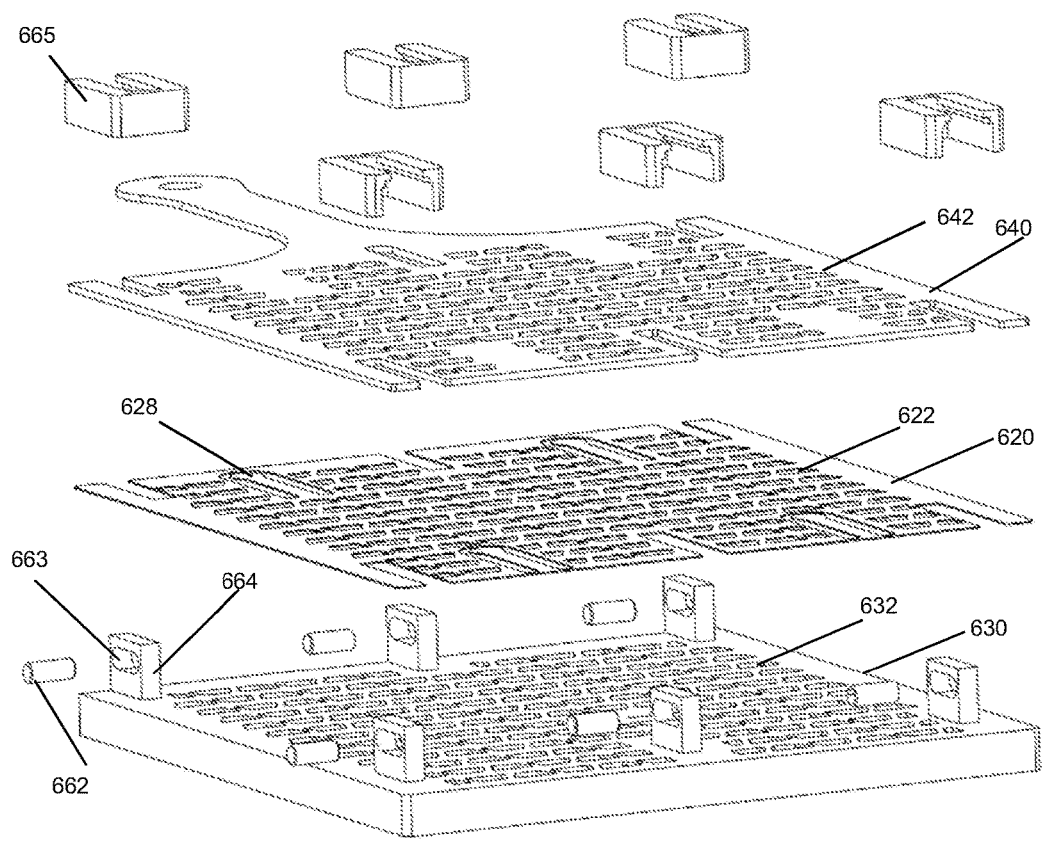
Figure 16A:
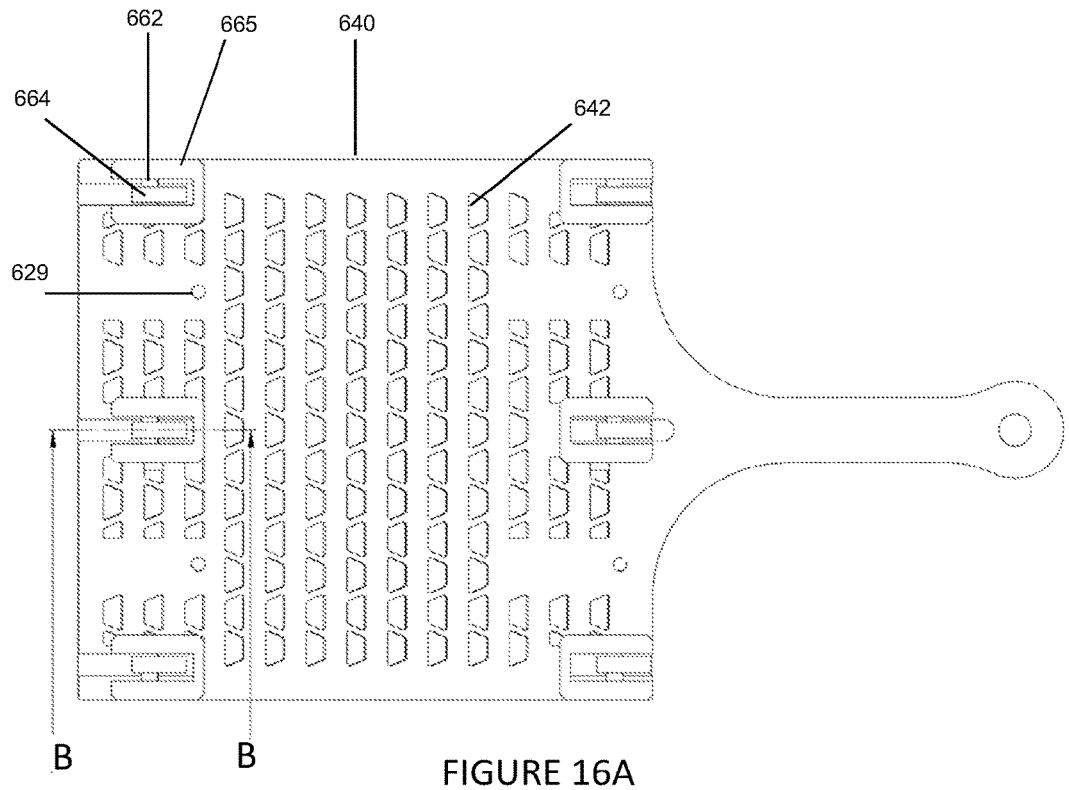
FIGS. 16A and 16B are schematic plan and sectional views of the screen valve of FIG. 14.
Figure 16B:
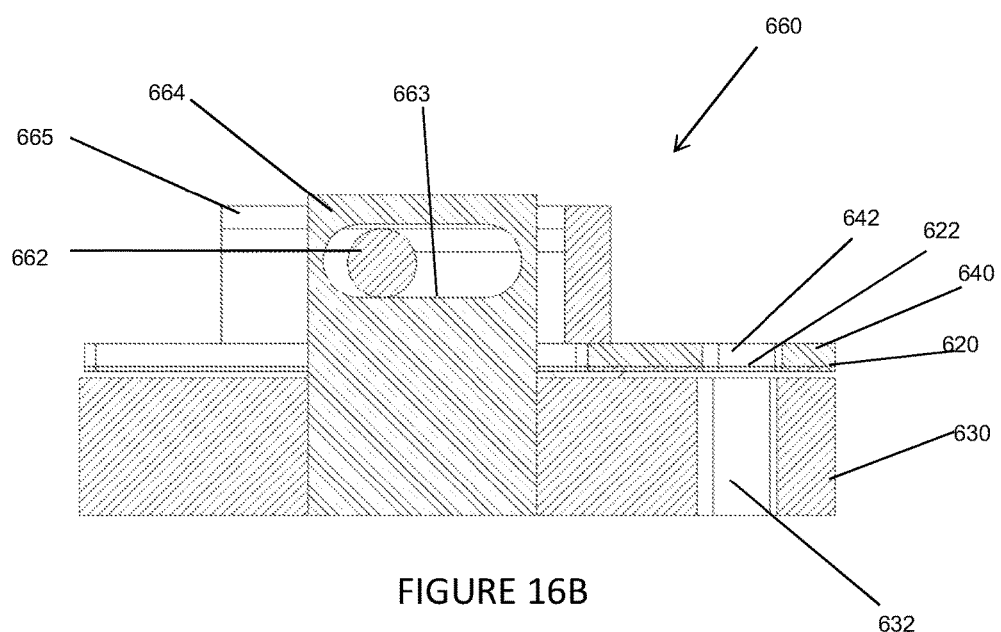

FIGS. 11 to 13 show an entire valve according to a sixth embodiment of the present invention. FIGS. 14 to 16 show an entire valve arrangement according to a seventh embodiment of the present invention. These show two alternative ways of supporting the carrier plate so it may move laterally while maintaining a fixed spacing relative to the valve seat. Either of those embodiment screen valves may be combined with any of the embodiments shown in FIGS. 2 to 9, which show details in relation to specific apertures such as preferred aperture profiles or details on the faces of the respective carrier plates, valve plates or valve seat.

FIGS. 11 to 13 show a screen valve 500 comprising carrier plate 540 supported by a plurality of carrier support flexures 560 suspended from a fixed support structure (not shown) and connected to carrier plate 540 at four locations by welds 560a, as shown in FIG. 11B. In use, carrier plate 540 is caused via actuator arm 548 to slide laterally in a reciprocating manner aligned with the actuator arm in its own plane, at a fixed spacing above valve seat 530, in a direction between an open configuration in which first and third aperture arrays 522, 442 are registered with second aperture array 532 to allow flow of fluid through the valve and a closed configuration in which first and third aperture arrays 522, 542 are not registered with second aperture array 532 to prevent flow of fluid through the valve. FIG. 13 is an exploded view of the respective flexures 560, carrier plate 540, valve plate 520 and valve seat 530. As may be seen in FIG. 13, the valve plate 520 is supported by resilient elements 528 which are integrally formed with the valve plate and are fixedly attached to the above carrier plate 540 to allow the valve plate to float relative to the carrier plate 540. The resilient elements 528 are elongate elements with their elongate axis aligned parallel to the linear reciprocating movement such that both resilient elements 528 and flexures 560 pivot so as to swing slightly in an arc aligned with the reciprocating movement. The support flexures 560 for the carrier plate are preferably connected to the carrier plate at the plurality of location points along the carrier plate at which the resilient elements are also attached, so that they are co-located.

FIGS. 14-16

FIGS. 14 to 16 show a screen valve 600 comprising carrier plate 640 supported by a roller guide mechanism 660 mounted on valve seat 630. The mechanism comprises upstand 664 fixedly attached to the valve seat 630 and provided with rounded slot 663 adapted to receive and confine roller 662, which is also confined within a housing 665 fixedly attached to the carrier plate 640, so as to permit a lateral backward and forward movement of carrier plate 640 relative to, and a fixed spacing above, valve seat 630. The arrangement is assembled by placing the valve plate 620 and then carrier plate 640 over the upstand 664, inserting the rollers 662 in their slots 663 and then confining them within housings 665 which are fixedly secured to the carrier plate 640 so that the latter is robustly supported by the upstands 664 from the valve seat 630. This arrangement has the advantage of being compact and easily sealed. FIG. 14 shows the assembled screen valve 600 with six roller mechanisms 660.

In use, carrier plate 640 is caused via actuator arm 648 to slide laterally in a reciprocating manner parallel to its own plane, at a fixed spacing above valve seat 630, in a direction between an open configuration in which first and third aperture arrays 622, 642 are registered with second aperture array 632 to allow flow of fluid through the valve and a closed configuration in which first and third aperture arrays 622, 642 are not registered with second aperture array 632 to prevent flow of fluid through the valve. FIG. 15 is an exploded view of the roller guides 665, carrier plate 640, valve plate 620 and valve seat 630. The valve plate 620 is again supported by resilient elements 628 extending in the same direction as the actuator arm (and its line of movement), which elements are integrally formed with the valve plate and are fixedly attached to the above carrier plate 640 to allow the valve plate to float relative to the carrier plate 640.

The above embodiments are merely illustrative of the present invention and are not to be regarded as limiting. In particular, the references to above and below the valve seat are not to be regarded as limiting as the screen valve may adopt any orientation in use.

The invention claimed is:

1. A screen valve for controlling fluid flow comprising: at least one multi-apertured valve plate movable laterally translationally relative to a multi-apertured valve seat between a closed configuration whereby the apertures of the at least one multi-apertured valve plate and the apertures of the multi-apertured valve seat are not registered so as to prevent passage of a fluid, and an open configuration whereby the apertures of the at least one multi-apertured valve plate and the apertures of the multi-apertured valve seat are registered so as to permit passage of fluid, wherein the at least one multi-apertured valve plate is supported by a multi-apertured carrier plate operative to move laterally in synchrony with the at least one multi-apertured valve plate to maintain a predetermined lateral registration between the apertures of the at least one multi-apertured valve plate and the apertures of the multi-apertured carrier plate as the at least one multi-apertured valve plate moves relative to the multi-apertured valve seat between the open and closed configurations, the at least one multi-apertured valve plate being movable relative to the multi-apertured carrier plate so as to be able to lift off and return into contact with the multi-apertured valve seat.

2. The screen valve according to claim 1, wherein the multi-apertured carrier plate is supported by one or more support flexures suspended from a fixed support structure that allow lateral movement of the multi-aperture carrier plate.

3. The screen valve according to claim 1, wherein the multi-apertured carrier plate is supported by a roller guide mechanism that allows lateral movement of the multi-apertured carrier plate.

4. The screen valve according to claim 1, wherein the multi-apertured carrier plate is operatively connected to an actuator.

5. The screen valve according to claim 1, wherein each aperture of the multi-apertured carrier plate has a section with a cross-sectional area that decreases with increased distance from an outer surface of the multi-apertured carrier plate.

6. The screen valve according to claim 1, wherein the multi-apertured valve seat is provided with upstands so as to reduce planar surface contact between the at least one multi-apertured valve plate and multi-apertured valve seat in the closed configuration.

7. The screen valve according to claim 1, wherein the apertures of the at least one multi-apertured valve plate and the apertures of the multi-apertured carrier plate have a predetermined one to one registration.

8. The screen valve according to claim 7, wherein pairs of apertures of the at least one multi-apertured valve plate and the apertures of the multi-apertured carrier plate in one to one registration have identical profiles when viewed in a valve plate to valve seat direction.

9. The screen valve according to claim 1, wherein the screen valve is configured to generate a lifting force acting to lift the at least one multi-apertured valve plate towards the multi-apertured carrier plate when a fluid flow passes through the screen valve in a valve plate to valve seat direction.

10. The screen valve according to claim 9, wherein the screen valve includes aerodynamic features selectively provided around at least the apertures of the multi-apertured carrier plate so as to interact with the said fluid flow and generate the lifting force.

11. The screen valve according to claim 1, wherein the multi-apertured valve seat has an outer surface configured to deflect lateral components of flow to generate a flow with a component in a valve plate to valve seat direction.

12. The screen valve according to claim 11, wherein the outer surface of the multi-apertured valve seat includes a plurality of deflection profiles, each deflection profile being near or adjacent to a respective aperture of the multi-apertured valve seat.

13. The screen valve according to claim 1, wherein the at least one multi-apertured valve plate is a flexible member.

14. The screen valve according to claim 13, wherein the flexible member is able to conform to a face of the multi-apertured valve seat so as to provide a seal.

15. The screen valve according to claim 1, wherein the at least one multi-apertured valve plate is supported by the multi-apertured carrier plate via one or more resilient support elements configured so as to allow limited movement of the at least one multi-apertured valve plate normal to its own plane relative to a relaxed position.

16. The screen valve according to claim 15, wherein in the relaxed position the at least one multi-apertured valve plate is separated from the multi-apertured valve seat by a spacing greater than the spacing between the at least one multi-apertured valve plate and the multi-apertured carrier plate.

17. The screen valve according to claim 15, wherein the at least one multi-apertured valve plate is operatively connected to the multi-apertured carrier plate at a plurality of location points along the multi-apertured carrier plate via a plurality of resilient support elements.

18. A method of operating a screen valve according to claim 1, the method comprising lifting the at least one multi-apertured valve plate off from the multi-apertured valve seat during opening by increasing fluid pressure from below the multi-apertured valve seat, and moving the at least one multi-apertured valve plate down onto the multi-apertured valve seat during closing by increasing fluid pressure from above the multi-apertured valve seat, wherein aerodynamic features incorporated in at least the multi-apertured carrier plate selectively increase a lifting force acting to lift the at least one multi-apertured valve plate towards the multi-apertured carrier plate when a fluid flow is passing through the screen valve in a valve plate to valve seat direction.

19. The method according to claim 18, wherein the aerodynamic features generate a lifting force acting to urge the at least one multi-apertured valve plate towards the multi-apertured carrier plate when a fluid flow is passing through the screen valve in the valve plate to valve seat direction during a closing event after a mid-stroke part of a lateral stroke movement.

20. The method according to claim 19, wherein the aerodynamic features cause the lifting force to reverse to become a downward force urging the at least one multi-apertured valve plate away from the multi-apertured carrier plate at a selected point after the mid-stroke part of the lateral stroke movement where the at least one multi-apertured valve plate is approaching a fully closed lateral stroke position.

* * * * *